J. FREDRICKSON.
VEHICLE SPRING.
APPLICATION FILED FEB. 20, 1917.
1,265,072.  
Patented May 7, 1918.
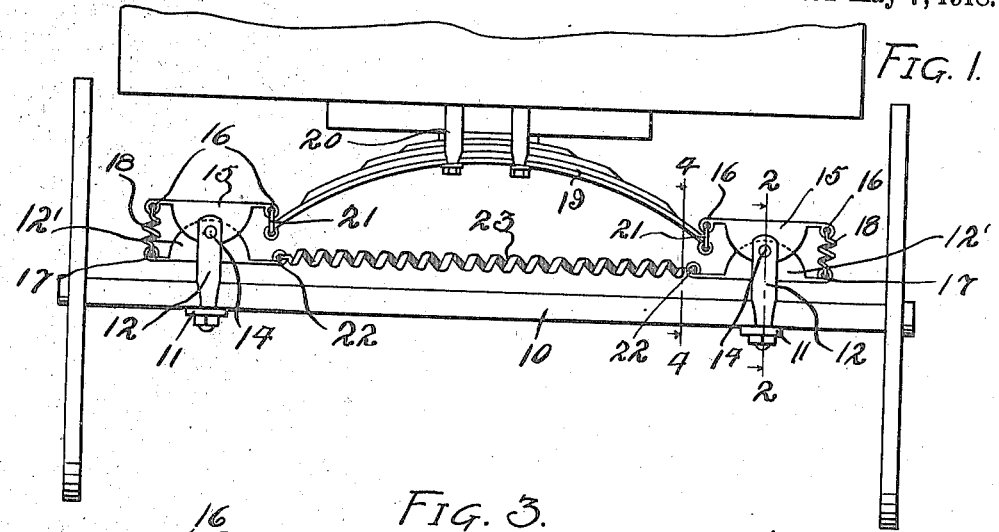
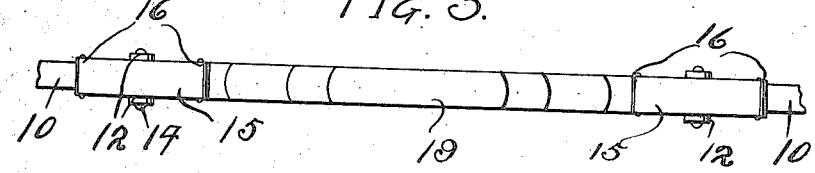
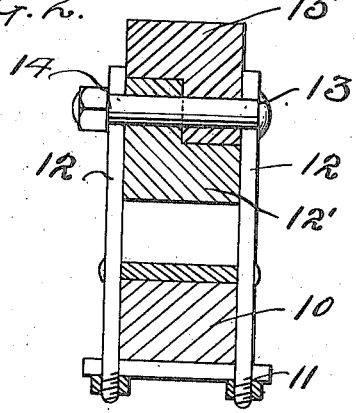
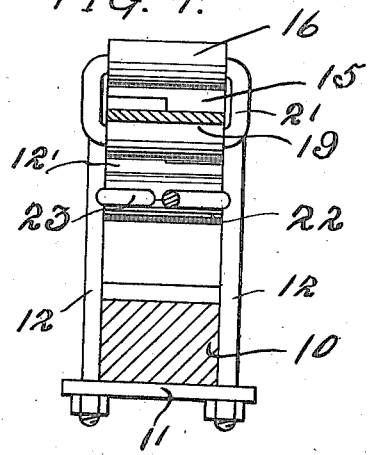
Witness  
C. A. Schrider  
H. M. Ikex
Inventor  
J. Fredrickson.  
By Chandler Chandler  
Attorney

UNITED STATES PATENT OFFICE.

JOE FREDRICKSON, OF PELICAN RAPIDS, MINNESOTA.

VEHICLE-SPRING.

1,265,072.   Specification of Letters Patent.   Patented May 7, 1918.

Application filed February 20, 1917. Serial No. 149,829.

*To all whom it may concern:*

Be it known that I, JOE FREDRICKSON, a citizen of the United States, residing at Pelican Rapids, in the county of Ottertail, State of Minnesota, have invented certain new and useful Improvements in Vehicle-Springs; and I do hereby declare the following to be a full, clear, and exact description of the invention, such as will enable others skilled in the art to which it appertains to make and use the same.

This invention relates to improvements in springs, and particularly to vehicle springs.

One object of the present invention is to provide a novel and simple device of this character which can be easily applied to any vehicle, such as wagons, carts, carriages, automobiles, and the like.

Another object is to provide a device of this character which will be durable and strong, and effective in its operation, and which will act quickly and evently to take up shock.

Other objects and advantages will be apparent from the following description when taken in connection with the accompanying drawing.

In the drawing:

Figure 1 is an elevation of my improved spring associated with the axle of a vehicle.

Fig. 2 is an enlarged vertical sectional view taken on the line 2—2 of Fig. 1.

Fig. 3 is a top plan view of the device.

Fig. 4 is a vertical sectional view taken on the line 4—4 of Fig. 1, enlarged.

Referring particularly to the accompanying drawing 10 represents the axle of a vehicle with which my invention is associated.

A clip 11 is secured to the axle near each end, said clip having a pair of vertical parallel arms 12 formed in their upper ends with alining openings 13. A lever is disposed between the arms 12, as at 12′, and receives a bolt 14 which is passed through the openings of the arms, whereby said lever is pivotally supported between the arms. A second lever 15 has its curved side disposed between the upper ends of the arms 12, and also receives the said bolt 14 therethrough. Thus the two levers are pivotally supported between the arms. At the ends of the straight side of the lever 15 are formed the eyes 16, while at the outer ends of the straight side of the lever 12′ there is formed a single eye 17. Connected to the eye 17, at one end, and to the outer eye 16 of the lever 15, at its other end, is a coil spring 18. An ordinary laminated bow or semi-elliptical spring 19 is connected to the bolster of the vehicle, as shown at 20, the ends of said spring being connected to the inner eyes 16 of the upper lever, by means of the short links 21.

It will thus be seen that downward pressure on the spring 19 will cause a rocking movement of the upper lever 15, which, by means of the connecting spring 18, is communicated to the lower lever. At the other end of the straight edge of the lower lever there is formed an eye 22, and connected at its opposite ends to the eyes 22 of both lower levers, is a long coil spring 23, said spring extending longitudinally above the axle, and being of a length somewhat less than that of the axle. This spring acts against the before-mentioned rocking movement of the levers, and serves to take up the larger part of the shock. It will, of course, be understood that the shorter springs 18 also serves to absorb some of the shock.

Attention is called to the fact that the spring 23 holds the levers in their proper position, and should one of the springs 18 be weaker than the other the action of the device will be approximately the same as though both were of the same strength. Thus the spring 23 holds the parts in properly balanced position, but is at all times ready to act to absorb the shock.

What is claimed is:

1. A suspension device for a vehicle including a body and an axle, clips detachably carried by the end portions of the axle of the vehicle and provided with upwardly extending arms, a pair of levers pivotally supported between the arms of each clip, springs connecting the levers of each pair at one end, a coil spring connecting the inner ends of one of each of the pairs of levers, and a semi-elliptical spring disposed between the inner ends of the others of the pairs of levers and connected therewith by links.

2. A suspension device for a vehicle including a body and an axle, a semi-elliptical spring arranged for attachment to the body of the vehicle, levers mounted on the axle and each pivotally connected at one end to one end of the semi-elliptical spring, and a coil spring extending between and connected to the remaining ends of the levers.

3. A suspension device for a vehicle including a body and an axle semi-elliptical spring secured to the vehicle body, a pair of levers pivotally mounted on the axle of the vehicle and each having one end pivotally connected to a corresponding end of the semi-elliptical spring, a second pair of levers also mounted pivotally on the axle, springs connecting corresponding ends of the levers together, and a coil spring connected to the remaining ends of the second pair of levers.

In testimony whereof, I affix my signature, in the presence of two witnesses.

JOE FREDRICKSON.

Witnesses:
L. G. ONSUM,
CLARENCE BUCK.